United States Patent
Saito et al.

(10) Patent No.: US 9,632,291 B2
(45) Date of Patent: Apr. 25, 2017

(54) INFRARED OPTICAL SYSTEM, INFRARED IMAGE CAPTURING APPARATUS

(71) Applicant: SONY CORPORATION, Tokyo (JP)

(72) Inventors: Masahiro Saito, Kanagawa (JP); Hidetoshi Kabasawa, Saitama (JP)

(73) Assignee: SONY CORPORATION, Tokyo (JP)

( * ) Notice: Subject to any disclaimer, the term of this patent is extended or adjusted under 35 U.S.C. 154(b) by 199 days.

(21) Appl. No.: 14/402,734

(22) PCT Filed: May 14, 2013

(86) PCT No.: PCT/JP2013/003065
§ 371 (c)(1),
(2) Date: Nov. 21, 2014

(87) PCT Pub. No.: WO2013/179592
PCT Pub. Date: Dec. 5, 2013

(65) Prior Publication Data
US 2015/0103182 A1 Apr. 16, 2015

(30) Foreign Application Priority Data

May 31, 2012 (JP) .................................. 2012-124712

(51) Int. Cl.
*H04N 5/33* (2006.01)
*G06K 7/00* (2006.01)
(Continued)

(52) U.S. Cl.
CPC ............... *G02B 13/14* (2013.01); *G02B 3/08* (2013.01); *H04N 5/33* (2013.01)

(58) Field of Classification Search
CPC ... H04N 5/33; G06K 7/00; G02B 5/08; G02B 23/12; G02B 15/14; G02B 13/14; G02B 23/24
(Continued)

(56) References Cited

U.S. PATENT DOCUMENTS 7,187,505 B2 * 3/2007 Claytor ................. G02B 3/08
359/356

FOREIGN PATENT DOCUMENTS

| JP | H07-218648 | 8/1995 |
| JP | H08-327317 | 12/1996 |

(Continued)

OTHER PUBLICATIONS

International Search Report prepared by the Japanese Patent Office on Aug. 20, 2013, for International Application No. PCT/JP2013/003065.

*Primary Examiner* — Daquan Zhao
(74) *Attorney, Agent, or Firm* — Chip Law Group (57) ABSTRACT

There is provided an infrared optical system includes a light collecting lens having a curved light collecting surface for collecting infrared light incident from an object side, the lens being made of resin having a stepped shape being gradually deeper from periphery to center; and an optical path length correction element for correcting a difference in an optical path length produced by the stepped shape of the light collecting lens. The above-described stepped shape is provided to allow the lens to be thinner than the lens having the plano-convex shape. In other words, the infrared transmittance of the optical system is improved. In addition, the optical path length correction element can correct a difference in an optical path length produced by the stepped shape of the light collecting lens.

12 Claims, 7 Drawing Sheets

First embodiment (51) Int. Cl.
*G02B 5/08* (2006.01)
*G02B 23/12* (2006.01)
*G02B 13/14* (2006.01)
*G02B 3/08* (2006.01)
*G02B 15/14* (2006.01)
*G02B 23/24* (2006.01)

(58) Field of Classification Search
USPC ....... 359/350, 351, 353, 354, 355, 356, 357, 359/362; 348/164
See application file for complete search history.

(56) References Cited

FOREIGN PATENT DOCUMENTS

| | | |
|---|---|---|
| JP | H10-301024 | 11/1998 |
| JP | 2001-141993 A | 5/2001 |
| JP | 2006-47343 A | 2/2006 |
| JP | 2008-128913 A | 6/2008 |
| WO | WO 00/52511 A1 | 9/2000 |

* cited by examiner

FIG.1

First embodiment

INFRARED OPTICAL SYSTEM, INFRARED IMAGE CAPTURING APPARATUS

CROSS REFERENCE TO RELATED APPLICATIONS

This application is a national stage application under 35 U.S.C. 371 and claims the benefit of PCT Application No. PCT/JP2013/003065 having an international filing date of May 14, 2013, which designated the United States, which PCT application claimed the benefit of Japanese Patent Application No. 2012-124712 filed May 31, 2012, the disclosure of both the above-identified applications are incorporated herein by reference.

TECHNICAL FIELD

The present invention relates to an infrared optical system used in a system for acquiring an infrared capturing image such as thermography and night vision, and to an infrared image capturing apparatus using the infrared optical system.
Patent Document 1: Japanese Patent Application Laid-open No. 8-327317
Patent Document 2: Japanese Patent Application Laid-open No. 10-301024
Patent Document 3: Japanese Patent Application Laid-open No. 7-218648

BACKGROUND ART

A far infrared ray is light having a wavelength of 8 um to 12 um, is emitted from a human or an animal as heat, i.e., an infrared ray, and is therefore used to capture an image at dark place and observe a temperature distribution. For example, it is used for a field such as night viewer (night vision) in an automobile, nightwatch and a power supply control of an air conditioner, a television, etc.

In an application where a shape of an object to be captured (subject) is image-formed such as thermoviewer and a night vision system, a relatively high resolution is needed.

In the future, in order to widen the applications of a far infrared device, an optical system should be produced at low costs while such a high resolution is kept.

Also, in order to improve sensitivity, an infrared transmittance of the optical system should be improved.

Figure 10:
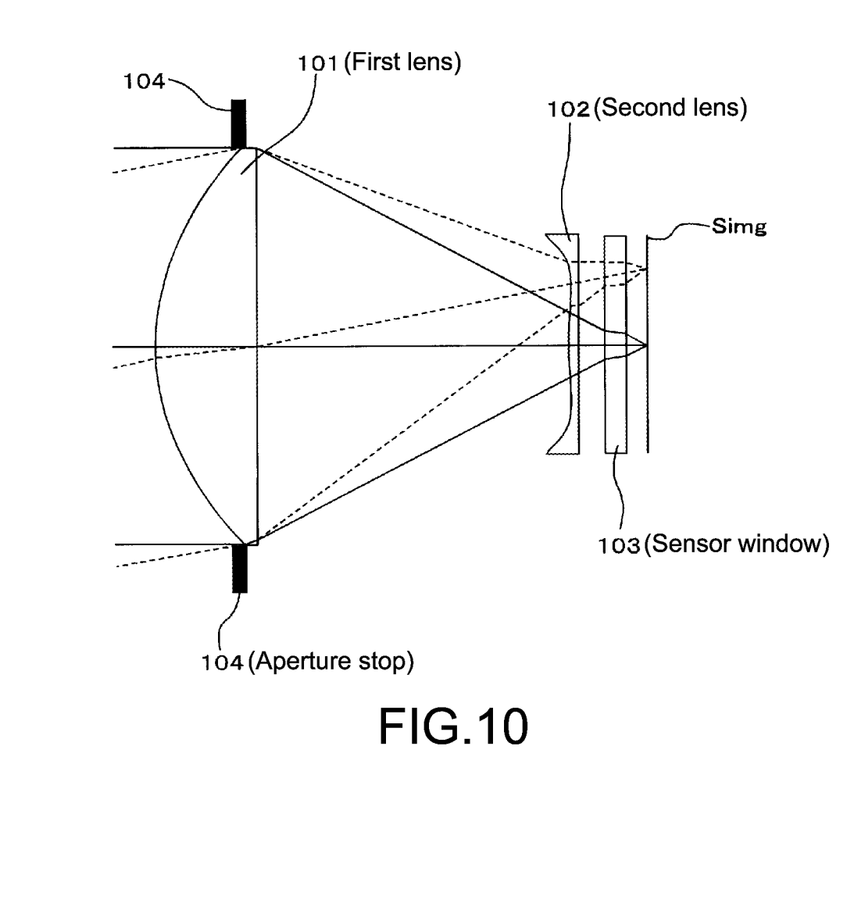
FIG. 10 A diagram showing a configuration of an infrared optical system in the related art.

FIG. 10 illustrates a configuration of an infrared optical system included in an infrared image capturing apparatus in the related art.

It is supposed that an object to be captured is disposed at a left side in FIG. 10.

As shown, the infrared optical system in the related art includes an aperture stop 104, a first lens 101, a second lens 102 and a sensor window 103 from an object side. "Simg" disposed at a rightmost side in FIG. 10 represents an image capturing surface of an image sensor (imager) for detecting an infrared image.

The first lens 101 functions as a light collecting lens for collecting infrared rays from an object.

Specifically, the first lens 101 in this case is a so-called plano-convex lens having an aspherical convex surface at the object side and a plane surface at the image surface side, and collects infrared rays emitted from each position of the subject on the imager.

The second lens 102 functions as an aberration correction lens for correcting a variety of aberrations such as spherical aberration, coma aberration and astigmatism aberration. In this case, the second lens 102 has an aspherical shape at the object side and the plane surface at the image surface side as shown.

The sensor window 103 is disposed to protect the image capturing surface Simg of the imager.

Here, for the optical system for collecting far infrared rays, a glass lens used for general visible light cannot be used because the transmittance is low. A suitable material well transmits infrared rays and includes germanium, silicon, zinc sulfide, selenium sulfide, chalcogenide glass provided by mixing chalcogen and germanium.

Germanium has a high refractive index, i.e., about 4, helps to aberration correction and less absorbs infrared light, which has been conventionally widely used. However, as germanium is a rare mineral, the material itself is expensive. When the number of the lenses increases, the image capturing optical system becomes undesirably very expensive.

Although the aspherical shape can be used to provide the aberration correction with the minimum number of the lenses, cutting work and polishing processing are also costly. At present, an inexpensive infrared optical system cannot be configured.

The above-described materials other than germanium are inexpensive materials as compared to germanium. However, working and processing remain costly. An inexpensive optical system is not yet achieved.

It is desirable that the resin lens can be produced inexpensively by molding at low costs.

However, most of the resin lens does not transmit electromagnetic rays at far infrared range. Polyethylene resin is used to a small extent.

Note that it is not true that polyethylene does not absorb. When a general lens shape is tried to be provided, it transmits almost no infrared rays.

At present, the resin lens is not used for image-forming that requires high resolution such as the above-described thermoviewer and a night vision system, but is used for simply determining the presence or absence of a heat source such as a motion sensor.

For example, Patent Document 1 discloses a configuration that a dome shaped region segmentation lens (a region segmentation prism) is used to segment a special region to determine the presence or absence of a human or a material emitting infrared rays in each region.

In addition, Patent Document 2 and Patent Document 3 disclose an optical system using a Fresnel lens.

SUMMARY OF INVENTION

Problem to be Solved by the Invention

The above-described region segmentation prism and the Fresnel lens can be molded relatively thin using the resin material, and can be considered as being used to provide an inexpensive light collecting lens that transmits infrared rays.

If the region segmentation prism and the Fresnel lens are applied to the light collecting lens of the infrared optical system shown in FIG. 10, the region segmentation prism and the Fresnel lens generate a phase jump between infrared rays transmitted through each region. Therefore, the infrared rays incident from the object side cannot be collected at one point.

As each region of the region segmentation prism and the Fresnel lens functions as a lens having a small NA (Numerical Aperture), a spot cannot be narrowed.

When it is supposed that the application for image-forming that requires high resolution such as the above-described thermoviewer and a night vision system, a low resolution may be problematic.

In view of the above-described circumstances, the present technology is made. An object thereof is to provide an infrared optical system and an infrared image capturing apparatus having good optical properties in a far infrared ray area (8 um to 12 um) while costs are reduced.

Means for Solving the Problem

In order to solve the above-described object, the infrared optical system is configured as follows according to the present technology.

In other words, the infrared optical system according to the present technology includes a light collecting lens having a curved light collecting surface for collecting infrared light incident from an object side, the lens being made of resin having a stepped shape being gradually deeper from periphery to center, and an optical path length correction element for correcting a difference in an optical path length produced by the stepped shape of the light collecting lens.

An infrared image capturing apparatus according to the present technology includes the infrared optical system according to the present technology, an infrared detector for detecting infrared light collected by the infrared optical system, and an image signal acquisition unit for acquiring an infrared image capturing signal based on an infrared detecting signal provided by the infrared detector.

As described above, according to the present technology, the light collecting lens is made of resin to reduce the costs. As to the light collecting lens, the above-described stepped shape is provided to allow the lens to be thinner than the lens having the plano-convex shape. In other words, the infrared transmittance of the optical system is improved.

In this case, when the lens having the above-described stepped shape is compared to the lens having an original shape and having no stepped shape, a difference in the optical path length may be produced on the light passing through the respective steps (excluding the step at the outermost periphery). In order to correct the difference in the optical path length per each step, the above-described optical path length correction element is provided. In this way, a light collecting capability is prevented from decreasing. In other words, the resolution capability is prevented from decreasing.

Effect of the Invention

According to the present technology, the infrared optical system and the infrared image capturing apparatus having good optical properties where the resolution capability is prevented from decreasing in a far infrared ray area while costs are reduced.

MODE(S) FOR CARRYING OUT THE INVENTION

The embodiments of the present technology will be described in the following order.
<1. First Embodiment>
[1-1. Configuration of Infrared Image Capturing Apparatus]
[1-2. Configuration of Infrared Optical System]
[1-3. Design Example]
<2. Second Embodiment>
<3. Alternative Embodiment>

1. First Embodiment 1-1. Configuration of Infrared Image Capturing Apparatus

Figure 1:
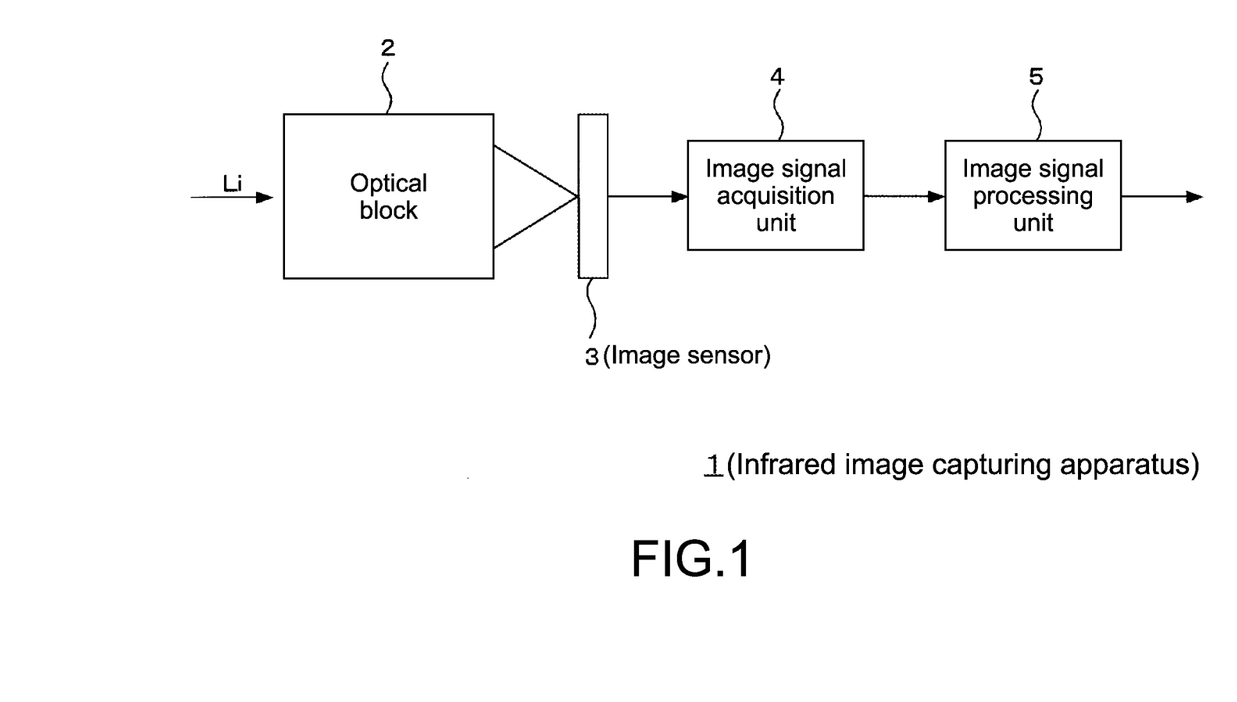
FIG. 1 A block diagram showing an internal configuration of an infrared image capturing apparatus according to an embodiment.

FIG. 1 is a block diagram showing an internal configuration of an infrared image capturing apparatus 1 according to an embodiment of the present technology.

As shown in FIG. 1, the infrared image capturing apparatus 1 includes an optical block 2, an image sensor (imager) 3, an image signal acquisition unit 4 and an image signal processing unit 5.

The optical block 2 comprehensively represents an infrared optical system in an embodiment as described later. The optical block 2 focuses infrared light (infrared ray) shown as incident light Li in FIG. 1 from an object onto an image capturing surface (image surface) of the image sensor 3.

The image sensor 3 detects infrared ray focused by the optical block 2, and acquires an infrared detection signal corresponding to the infrared ray from the object.

In order to provide the infrared detection signal, an example of an infrared detection element to be included in the image sensor 3 is a pyroelectric element. Alternatively, a thermopile type infrared detection element to which a thermocouple generating the Seebeck effect, or a bolometer type infrared detection element utilizing a change in a resistance value by a temperature increase can be used.

The infrared detection elements are not limited thereto, and any types thereof can be used as long as infrared rays can be detected.

When the pyroelectric element is used as the infrared detection element, a shutter is disposed to periodically shield the infrared rays incident on the image sensor 3, as the pyroelectric element does not output a value corresponding to a temperature itself, but outputs a value corresponding to a temperature difference (a temperature change). In other words, the above-described shutter periodically forms an irradiation status or a shielding status of the infrared rays to intentionally generate the temperature difference, whereby an adequate temperature distribution image (an infrared capturing image) is provided for an object at rest.

The image signal acquisition unit 4 inputs the infrared detection signal (a detection signal provided per the above-described infrared detection signal) provided by the image sensor 3 to provide an infrared image capturing signal.

The image signal processing unit 5 performs a variety of image signal processing for the image capturing signal provided by the image signal acquisition unit 4. For example, black level correction, pixel defect complement, aberration correction, optical shading correction, lens distortion correction, temperature control, calculation of a distance change amount, coding etc. are performed.

The output from the image signal processing unit 5 is transmitted to a display (image display apparatus) etc. external to the image capturing apparatus via an interface (not shown), etc.

1-2. Configuration of Infrared Optical System

Figure 2:
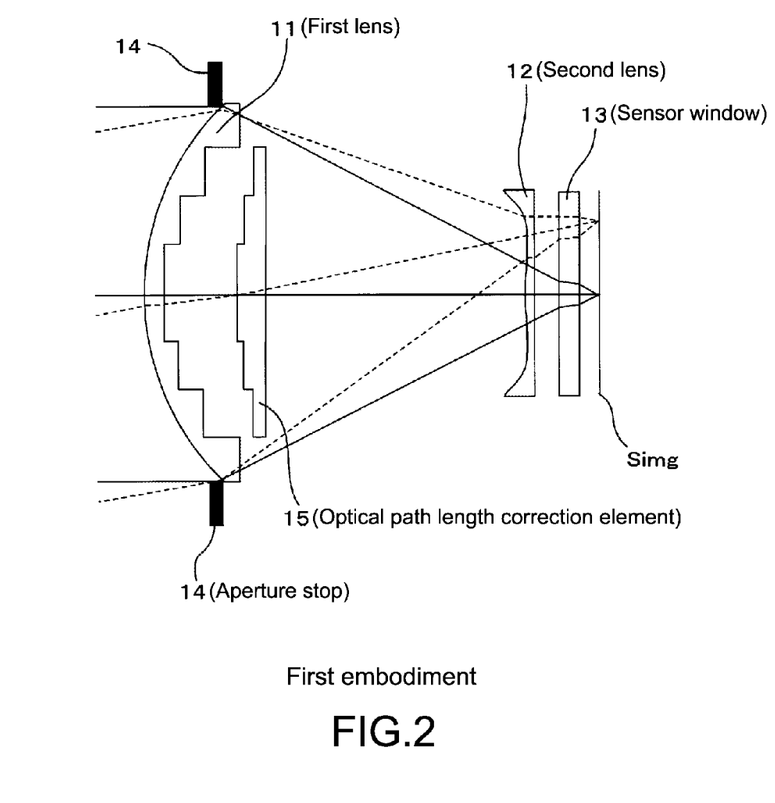
FIG. 2 A diagram showing a configuration of an infrared optical system according to a first embodiment.

FIG. 2 shows a configuration of an infrared optical system formed within the optical block 2 as a first embodiment.

Also, FIG. 2 shows an image capturing surface Simg of the image sensor 3 shown in FIG. 1.

It is also supposed that an object to be captured is disposed at a left side in FIG. 2 similar to FIG. 10.

As shown, the infrared optical system in the first embodiment includes an aperture stop 14, a first lens 11, an optical path length correction element 15, a second lens 12 and a sensor window 13 from an object side to an image surface side.

The first lens 11 has a curved light collecting surface, and functions as a light collecting lens for collecting infrared light (infrared rays) incident from the object side. The first lens 11 is made of resin.

The second lens 12 functions as an aberration correction lens for correcting a variety of aberrations such as spherical aberration, coma aberration and astigmatism aberration. In this case, the second lens 12 has an aspherical shape at the object side and a plane surface at the image surface side as shown.

The sensor window 103 is disposed to protect the image capturing surface Simg of the image sensor 3.

In this embodiment, as the first lens 11 functioning as the light collecting lens is made of resin, cost reduction is promoted.

Note that the first lens 11 is preferably thin in view of the fact that transmittance of a resin material (at an area to far infrared rays) is low.

Accordingly, in this embodiment, the first lens 11 has not a plano-convex shape as shown in FIG. 10 used in the conventional configuration, but has a stepped shape provided by hollowing the plano-convex shape. Specifically, the stepped shape gets gradually deeper from periphery to center.

In this manner, the lens becomes thin.

Figure 3:
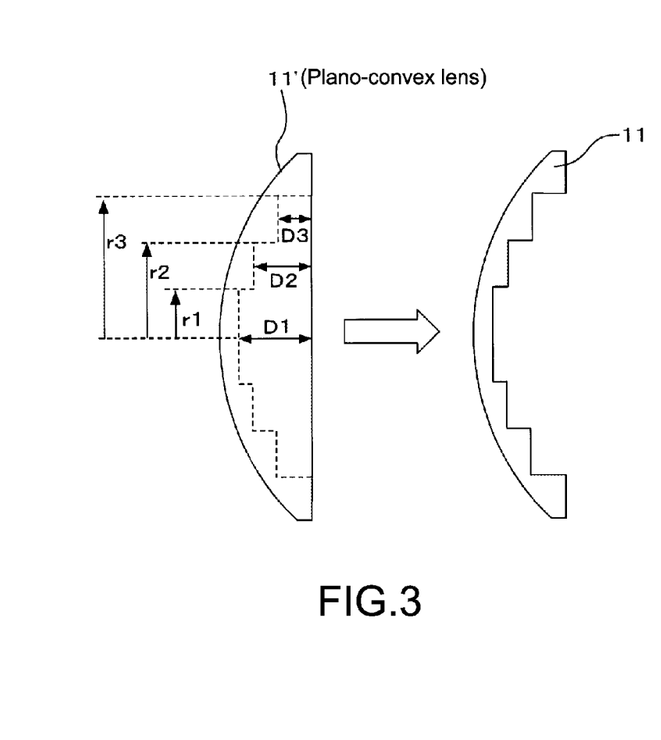
FIG. 3 A diagram for illustrating a method of producing a light collecting lens according to the first embodiment.

FIG. 3 is a diagram for illustrating a method of producing the first lens 11.

As shown in FIG. 3, the first lens 11 in the first embodiment can be produced by hollowing the plano-convex lens.

Specifically, a plano-convex lens 11' for producing the first lens 11 is produced in advance. The plano-convex lens 11' is hollowed from a plane surface side (i.e., an opposite surface of the curved light collecting surface) to have the stepped shape that becomes gradually deeper from the periphery to the center.

In this embodiment, the steps have three different depths (a step number equals to 3). As shown, the steps having three different depths D are formed. These three steps are denoted as a first step, a second step and third step from the center.

A depth of the first step disposed at the center is denoted as "D1", a depth of the second step disposed adjacent to the first step at the periphery is denoted as "D2", and a depth of the third step disposed at outermost periphery is denoted as "D3".

A radius to a boundary between the first step and the second step is denoted as "r1", a radius to a boundary between the second step and the third step is denoted as "r2", and a radius at the outermost periphery of the third step is denoted as "r3".

In this case, the first lens 11 can be produced by hollowing the plano-convex lens 11' into a cylindrical shape having a depth of D3 and a diameter of r3×2, then hollowing it into a cylindrical shape having a depth of D2 and a diameter of r2×2, and further following it into a cylindrical shape having a depth of D1 and a diameter of r1×2.

A surface shape of the lens before hollowing may be optimized in order to cut thickly to the stepped shape. The surface shape should not be continuous in all areas before each step is provided.

All widths of each step of the first lens 11 having the stepped shape perpendicular to an optical axis excluding the that of the step positioned at the outermost periphery (i.e., the step having depth D=0) are desirably equal. If the widths are different, a diffraction effect may be great.

A maximum thickness in the optical axis direction (a maximum thickness in an area contributing to image formation) of the first lens 11 is preferably thin in terms of the transmittance.

The maximum thickness of the first lens 11 should be set such that the transmittance of the infrared rays is at least 20% or more.

Specifically, the maximum thickness of the first lens 11 is desirably 1 mm or less.

As the resin material of the first lens 11, polyethylene can be used, for example.

Using polyethylene, the lens that absorbs less infrared rays can be produced.

Among polyethylenes, high density polyethylene, high molecular weight polyethylene etc. may be selected. In view of heat resistance and impact resistance, high molecular weight polyethylene is desirably used.

The polyethylene has the transmittance of infrared rays of 20% or more at a thickness of 2 mm, and is the resin material that can be worked using a die. The material of the first lens 11 should not be limited to polyethylene as long as such conditions are satisfied.

As described above, the first lens 11 can have a thin lens thickness by providing the stepped shape, thereby improving the transmittance.

However, when the stepped shape is provided, infrared rays transmitting the first lens 11 may have a phase-shifted wavefront. In other words, by disposing the steps, a space originally within the lens is replaced with an air space, thereby producing a difference in the optical path length.

The optical path length of light collecting to the image capturing surface Simg is different. As a result, an imaging performance may be degraded.

In addition, the step may cause a focal point deviation.

Figure 4:
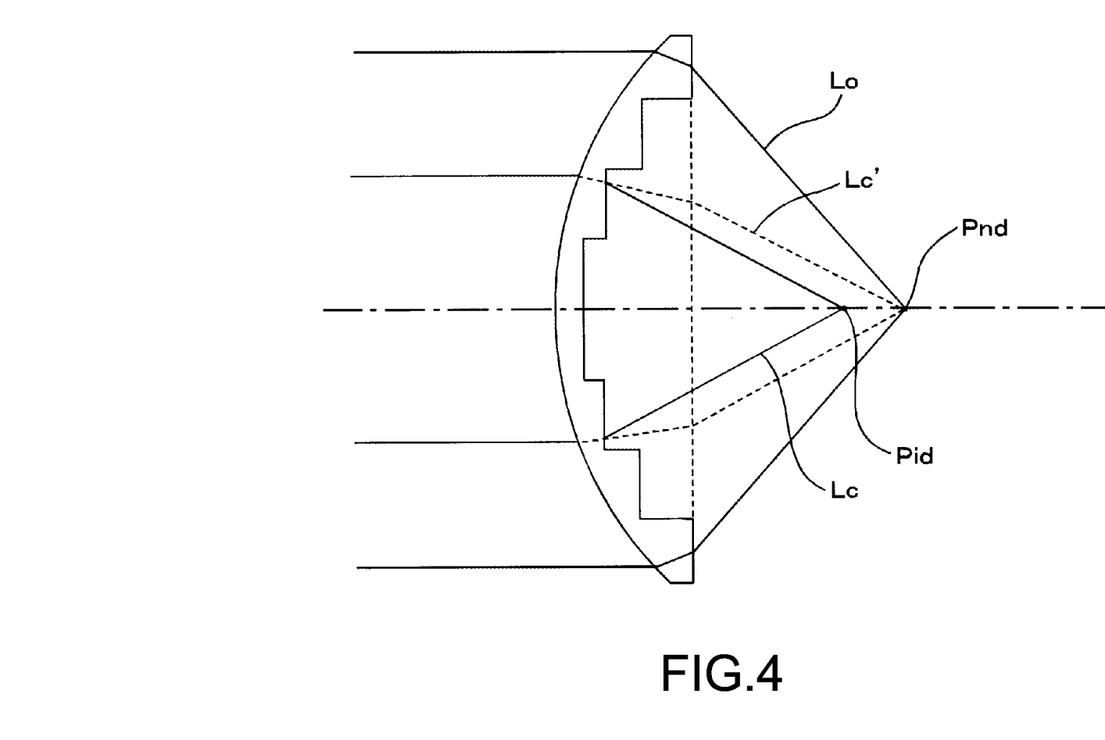
FIG. 4 A diagram for illustrating a focal point deviation produced by steps in the first embodiment.

FIG. 4 is a diagram for illustrating the focal point deviation produced by the steps in the first embodiment.

FIG. 4 shows a light beam Lo passing through the outermost periphery having no steps and a light beam Lc passing through a stepped area. Also, FIG. 4 shows an exit surface of the plano-convex lens 11' before providing the steps in a dash line, and shows a light beam Lc' after the light beam Lc passes through the plano-convex lens 11'.

As shown, both of the light beam Lo and the light beam Lc are parallel to the optical axis (a dashed-dotted line in FIG. 4).

As shown, the focal point of the light beam Lo passing through the area having no steps and the focal point of the light beam Lc' passing through the plano-convex lens 11' are the same point Pnd in FIG. 4. This fact can be understood that incident lights parallel to the optical axis are collected at the same position in the plano-convex lens 11'.

In contrast, the focal point of the light beam Lc passing through the area will be a point Pid being different from the point Pnd. Specifically, the focal point Pid of the light passing through the stepped area is positioned before the focal point Pnd.

Thus, when the lens is thinned by providing the stepped shape, the space originally within the lens is replaced with the air space, thereby producing the difference in the optical path length (a phase difference), and the focal point deviation produced on the light passing through the steps. The focal point deviation facilitates a degradation of the imaging performance. It is desirable to inhibit the deviation in order to prevent resolution capability from decreasing.

According to the embodiment, the optical path length correction element 15 is disposed in order to correct the difference in the optical path length, as shown in FIG. 2.

Figure 5:
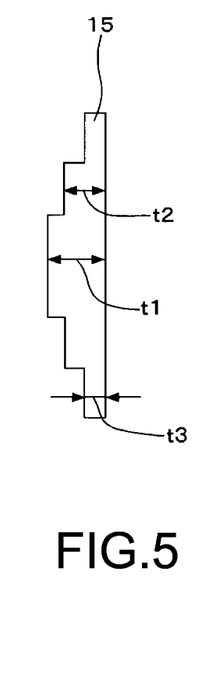
FIG. 5 A diagram for illustrating an optical path length correction element.

FIG. 5 is a diagram for illustrating the optical path length correction element 15.

In this embodiment, the optical path length correction element 15 is provided with the stepped shape corresponding to the stepped shape of the first lens 11. Specifically, the light passed through the steps of the first lens 11 produces the difference in the optical path length depending on the depths D of the steps. The optical path length correction element 15 is provided with the stepped shape such that the thickness of the optical path length correction element 15 is great at an area where the light passed through the step having a great depth of the first lens 11 and that is small at an area where the light passed through the step having a small depth.

More specifically, in this embodiment, the stepped shape is provided such that the area where the light passed through the step having the above-described depth D1 is thickest (thickness t1 in FIG. 5), the area where the light passed through the step having the depth D2 is next thicker (thickness t2 in FIG. 5) and the area where the light passed through the step having the depth D3 is still next thicker (thickness t3 in FIG. 5).

By disposing the optical path length correction element 15, the difference in the optical path length (the phase difference) produced by displacing the space originally within the lens is replaced with the air space can be corrected. In this way, the imaging performance can be prevented from degraded and the resolution capability can be prevented from decreasing.

Also, by disposing the optical path length correction element 15, a focal point Pin is shifted to an original focal point Pnd, i.e., shifted from a near side to a far side, when the light passes through the steps. As a result, the deviation of the focal point accompanied by the steps can be inhibited. In this way, the resolution capability is prevented from decreasing.

In this manner, according to the infrared optical system in the first embodiment, the first lens 11 can be thin to provide the transmittance, and good imaging performance can be provided.

As understood from the above description, this embodiment supposes that the light beam transmitted through an nth step from the center of the first lens 11 passes through an nth step from the center of the optical path length correction element 15, thereby adjusting the phase difference. Accordingly, the optical system in this case is desirably designed such that a step position where the light beam transmits the first lens 11 and a step position where the light beam transmits the optical path length correction element 15 are constant. Specifically, the optical path length correction element 15 is desirably positioned as near to the first lens 11 as possible.

As described above, the phase difference should be adjusted by passing the light beam transmitted through the nth step from the center of the first lens 11 through the nth step from the center of the optical path length correction element 15. At this time, all light beams are not arranged in parallel to the optical axis. The light beams from different field angles of object points have different exit angles even though they transmit the first lens 11 at the same position. Consequently, when the first lens 11 is distant from the optical path length correction element 15, the light beams may incident on other step of the optical path length correction element 15. In this case, the phase will be corrected excessively. Therefore, the optical path length correction element 15 is desirably positioned as near to the first lens 11 as possible.

The optical path length correction element 15 is made of a material having a refractive index higher than the first lens 11 made of resin. In this manner, the optical path length correction element 15 can be thin. As the refractive index is high, the difference in the optical path length corresponding to a cut thickness of the first lens 11 can be covered by a thinner shape.

In this embodiment, Si (silicon) is used for the material of the optical path length correction element 15.

Si has an infrared transmittance lower than germanium, but is relatively inexpensive lens material. Therefore, cost reduction is promoted.

Furthermore, as the optical path length correction element 15 has the step shape as shown in FIG. 5, the optical path length correction element 15 can be produced at low costs as compared to the case that the spherical shape and the aspherical shape are worked, even though Si that is difficult to be worked is used.

Here, if the optical path length correction element 15 has the refractive index higher than the first lens 11, a refractive index difference between the element 15 and air becomes great, and a Fresnel reflection loss becomes great. Therefore, antireflection processing is desirably applied to the optical path length correction element 15.

For example, antireflection films are vapor-deposited on or antireflection structures are added to both surfaces of the optical path length correction element 15, thereby significantly improving the transmittance.

1-3. Design Example

Next, a design example of the infrared image capturing apparatus according to the first embodiment will be described.

First, each distance is set as follows:
Object-aperture stop 14: 3400 mm
Aperture stop 14-first lens 11: 0 mm
First lens 11-second lens 12: 14.24 mm
Second lens 12-sensor window 13: 1.08 mm
Sensor window 13-image capturing surface Simg: 0.95 mm
The aperture stop 14 has a diameter of 18 mm.
The first lens 11 has an aspherical shape at an object side.

Here, the aspherical shape is determined by each coefficient according to the following [Equation 1] using a radium r.

$$Z(r) = \frac{r^2/R}{1+\sqrt{1-(1+k)\cdot r^2/R^2}} + \quad \text{[Equation 1]}$$
$$A_4 r^4 + A_6 r^6 + A_8 r^8 + A_{10} r^{10} + \ldots$$

Here, $Z(r)$ represents a height of a lens surface at a point of the radius r when the optical axis is a center. The height of the surface has a negative value at the object side and a positive value at an image surface side. R represents curvature radius. k represents an eccentricity. $A_4$, $A_6$, $A_8$, $A_{10}$ are each aspherical coefficient.

Specifically, the aspherical shape of the first lens 11 is set by the respective coefficients in [Equation 1] as follows:
[Equation 1]
R: 10.8796 mm
k: −0.5958
$A_4$: $9.8378 \times 10^{-6}$
$A_6$: $-2.3467 \times 10^{-7}$
$A_8$: $-1.1699 \times 10^{-10}$
$A_{10}$: $6.365 \times 10^{-11}$
$A_{12}$: $-4.9188 \times 10^{-13}$ Using the above-described the depths D1 to D3 and the radii r1 to r3, the surface shape of the first lens 11 at an image surface side is represented by as follows:

A lens center thickness of a plano-convex lens 11' before hollowing is 4.65 mm.
Depth D1: 3 mm
Radius r1: 2 mm (diameter 4 mm)
Depth D2: 2 mm
Radius r2: 4 mm (diameter 8 mm)
Depth D3: 1 mm
Radius r3: 6 mm (diameter 12 mm)

The first lens 11 is made of high molecular weight polyethylene (refractive index of 1.54).

The second lens 12 has an aspherical shape at the object side determined by the following coefficients and has a plane surface at the image surface side.
R: 13.0351 mm
k: 1.59
$A_4$: $-1.3173 \times 10^{-3}$
$A_6$: $-3.745 \times 10^{-4}$
$A_8$: $3.6942 \times 10^{-5}$
$A_{10}$: $-1.889 \times 10^{-6}$
$A_{12}$: $3.5457 \times 10^{-8}$
Lens center thickness: 0.5 mm The sensor window 13 is an Si plate having flat surfaces (refractive index of 3.42) with a thickness of 1 mm.

A focal length of the optical system is 18 mm equivalent.

The optical path length correction element 15 is designed to correct the phase difference (the difference in the optical path length) between the respective light beams produced by the stepped shape of the first lens 11. Specifically, according to this embodiment where the high molecular weight polyethylene used as the first lens 11 has a refractive index of 1.54 and Si used as the optical path length correction element 15 has a refractive index of 3.42, when the thickness of the steps (excluding the step at the outermost periphery) of the first lens 11 is denoted as T, the thickness of the optical path length correction element 15 in the optical axis direction that is required by the area on which the light passed through the steps is incident is represented by "T×1.54/3.42".

As understood from this point, when the refractive index of the optical path length correction element 15 is increased, the thickness required for the correction can be thinned.

In this design example, thicknesses t1 to t3 of the optical path length correction element 15 were set as follows:
t1: 1.35 mm
t2: 0.90 mm
t3: 0.45 mm An area of the thickness t1 was from the center to a radius of 2 mm. Respective areas of the thickness t2 and the thickness t3 were from a radius of 2 mm to a radius of 4 mm, and from a radius of 4 mm to a radius of 6 mm, respectively.

Figure 6:
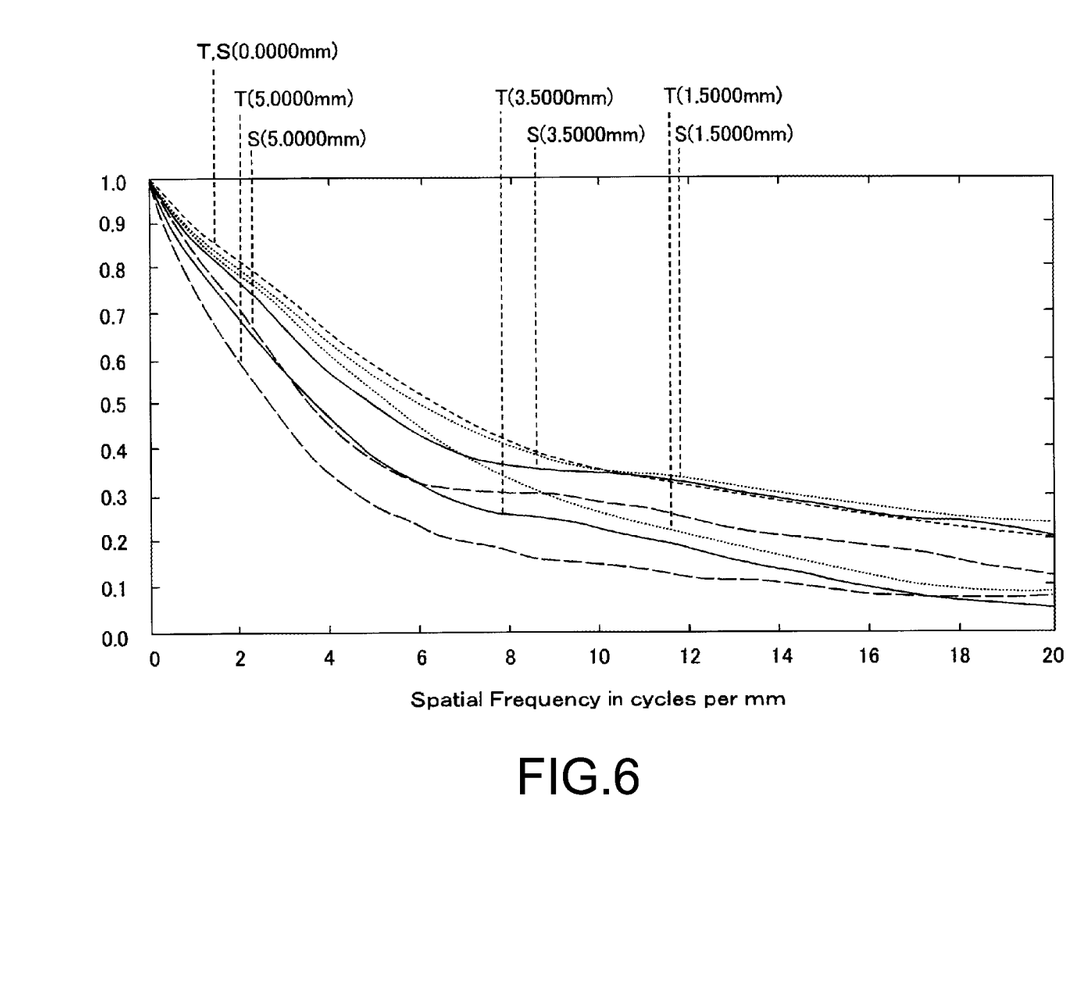
FIG. 6 An MTF diagram about the infrared optical system according to the first embodiment.

FIG. 6 is an MTF (Modulation Transfer Function) diagram about the infrared optical system in the first embodiment of the above-described design example.

Figure 7:
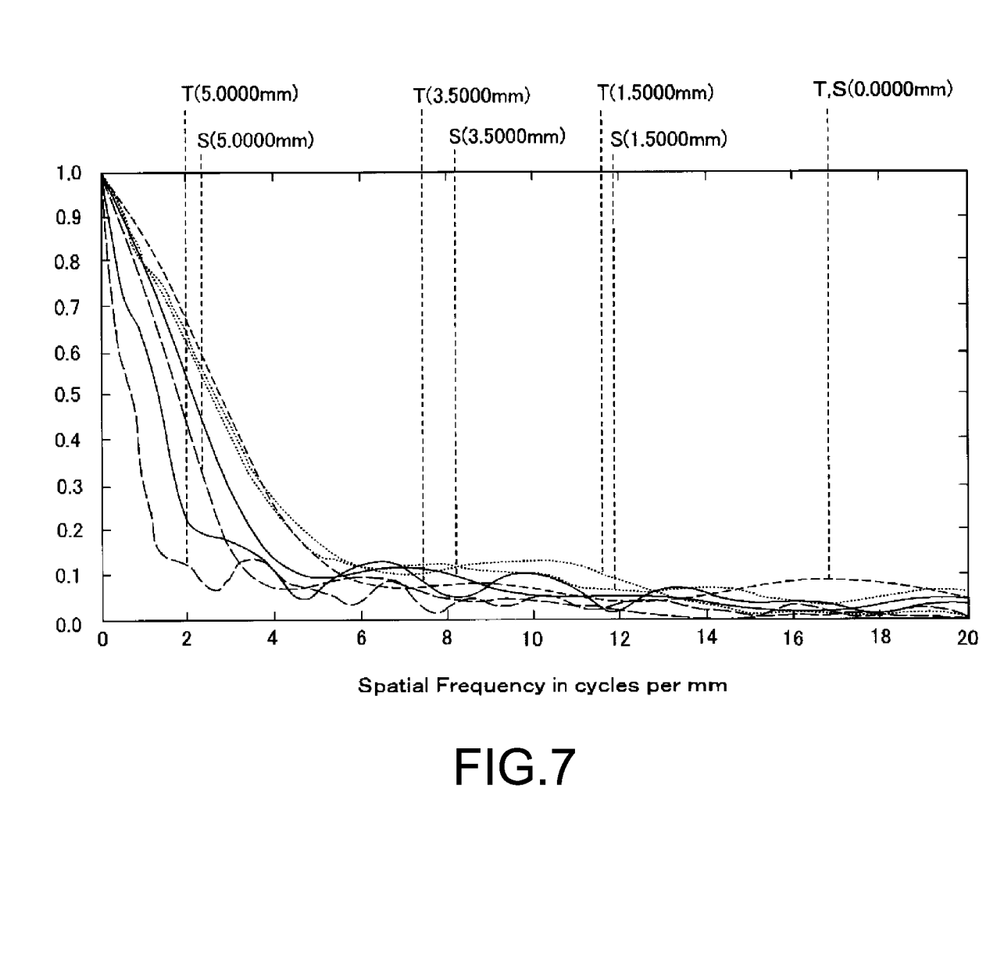
FIG. 7 An MTF diagram about the case omitting the optical path length correction element.

For comparison, FIG. 7 is the MTF diagram about the infrared optical system in the first embodiment of the above-described design example omitting the optical path length correction element 15.

FIGS. 6 and 7 show MTF values at respective positions of image heights of 0 mm, 1.5 mm, 3.5 mm and 5.0 mm.

The image height of 0 mm is represented by a short dashed line, the image height of 1.5 mm is represented by a dotted line, the image height of 3.5 mm is represented by a solid line, and the image height of 5.0 mm is represented by a long dashed line. In FIGS. 6 and 7, "T" means a tangential value, and "S" means a sagittal value.

By comparison of FIGS. 6 and 7, by inserting the optical path length correction element 15, it is shown that a decrease in the MTF is inhibited and the resolution of the optical system is improved.

As an indicator for sufficient resolution capability of a captured image, the MTF values at the corresponding spatial frequency [line pairs/mm] are used, and a threshold value is often set to 0.3 or more.

In FIG. 7 where the optical path length correction element 15 is excluded, the MTF value at the image height of 0 mm is lower than 0.3 at 4 [line pairs/mm]. In contrast, in FIG. 6 where the optical path length correction element 15 is used, the MTF value=0.3 is kept around 14 [line pairs/mm].

The 14 [line pairs/mm] means a pattern having 14 white and black alternative lines per 1 mm. A pattern width of only while or only black will be 1000/14/2, nearly equals to 36 μm. In the infrared optical system according to this design example, a lens system corresponding to a focal distance of 18 mm captures an object positioned 3400 mm apart, which results in 190 magnifications and the resolution capability of the object of 7 mm. This is the resolution capability to distinguish human fingers. As compared to resolution capability of the object of 25 mm per 4 [line pairs/mm], the resolution is significantly improved. A combination of the resin lens and the optical path length correction element 15 allows the infrared optical system capable of detecting the temperature distribution to be provided.

2. Second Embodiment

Next, a second embodiment will be described.

Figure 8:
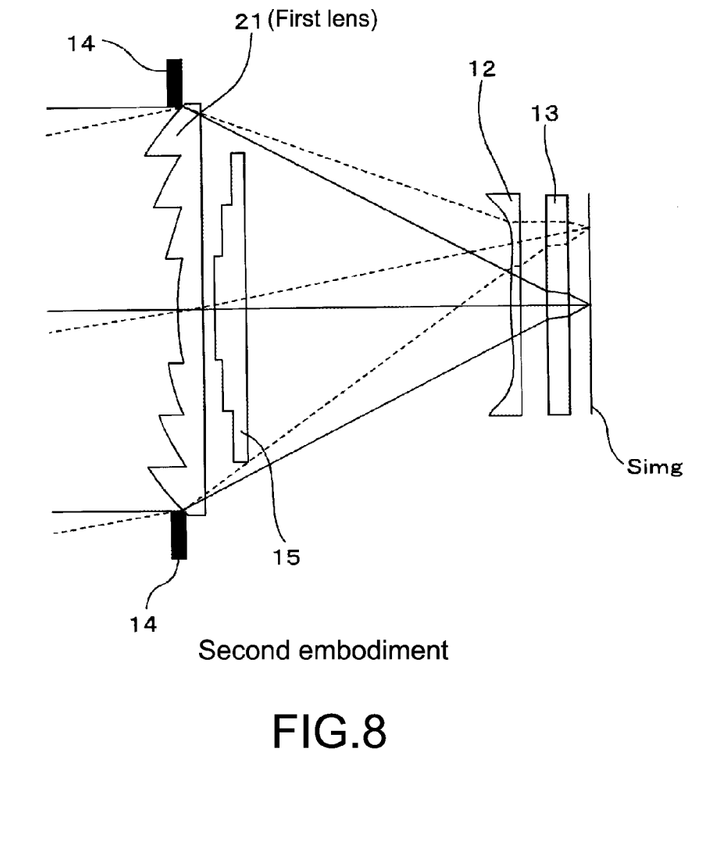
FIG. 8 A diagram showing a configuration of an infrared optical system according to a second embodiment.

FIG. 8 shows a configuration of an infrared optical system according to a second embodiment.

The components already described are denoted by the same reference numerals, and thus detailed description thereof will be hereinafter omitted.

An infrared image capturing apparatus according to the second embodiment includes the infrared optical system shown in FIG. 8 as the optical block 2 shown in earlier FIG. 1.

The infrared optical system according to the second embodiment shown in FIG. 8 is different from the infrared optical system shown in earlier FIG. 2 in that a first lens 21 is disposed instead of the first lens 11. The first lens 21 is also made of resin.

In the earlier first embodiment, the first lens 11 is thinned by providing the stepped shape at the image surface side. Alternatively, the first lens 21 according to the second embodiment is thinned by providing the stepped shape at the object side.

Specifically, in the first lens 21, the stepped areas in the first lens 11 in the earlier first embodiment, i.e., a range from the center to the radius r1, a range from the radius r1 to the radius r2 and a range from the radius r2 to the radius r3, are denoted as "blocks". The respective blocks are moved parallel to the optical axis direction so that planes of the image surface side are arranged at the same plane.

As understood from this point, the first lens 21 in the second embodiment also has a curved light collecting surface, collects infrared light incident from the object side, and has the stepped shape getting gradually deeper from the periphery to the center.

Also, the first lens 21 is thinned by providing the stepped shape. By disposing the stepped shape, the difference in the optical path length may be produced on the light passing through the respective steps depending on a stepped amount as compared to the case that an original shape is restored.

Also in this case, the optical path length correction element 15 is disposed to correct the difference in the optical path length, whereby the resolution capability can be prevented from decreasing.

Note that the stepped amount of the respective steps in the first lens 21 is the same as the stepped amount of the respective steps (the aforementioned D1 to D3) in the first lens 11. Therefore, the optical path length correction element 15 used in the first embodiment can be used to properly correct the optical path length.

For confirmation, the first lens 21 having the shape shown in FIG. 8 can be produced by a molding using a die, for example.

Figure 9:
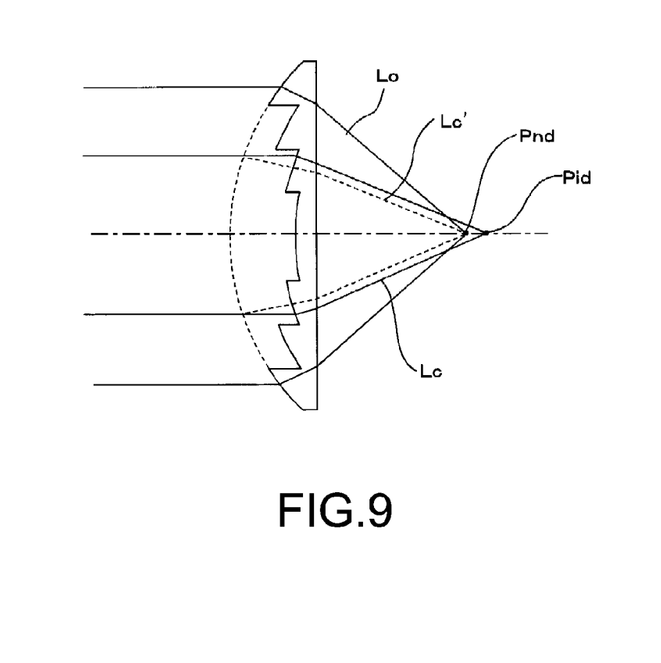
FIG. 9 A diagram for illustrating a focal point deviation produced by steps in the second embodiment.

In the second embodiment, the stepped shape is provided at the object side opposite to the first embodiment. As shown in FIG. 9, the focal point Pid of the light passing through the steps is shifted not to before the original focal point Pnd but to the far side thereof.

As understood from the description of the earlier first embodiment, by inserting the optical path length correction element 15, the focal point of the light passing through the steps is shifted to the far side. As understood from this point, in the second embodiment, by inserting the optical path length correction element 15, the difference in the optical path length accompanied by replacing the space within the lens with air can be corrected. However, unlike the first embodiment, the deviation of the focal point of the light passing through the steps cannot be corrected.

Taking the point into consideration, in the second embodiment, curved shapes of the respective steps in the first lens 21 at the object side are desirably optimized in order to inhibit the deviation of the focal point.

By the infrared optical system according to the above-described second embodiment, the infrared optical system and the infrared image capturing apparatus having good optical properties where the resolution capability is prevented from decreasing in a far infrared ray area while costs are reduced.

3. Alternative Embodiments

While the present technology is described herein with reference to illustrative embodiments, it should be understood that the present technology is not limited thereto.

For example, the description illustrates that three steps are provided to the first lens 11 or 21. When the number of the steps is increased and the resin lens is thin in the optical axis direction, the transmittance of the infrared rays can be further improved.

In the earlier description, the optical path length correction element 15 is disposed at the image surface side of the first lens functioning as the light collecting lens. However, the optical path length correction element 15 may be disposed at the object side of the first lens.

In the embodiment, the optical path length correction element 15 is used for correction using the illustrated stepped shape. Alternatively, the optical path length correction can be performed by other means such as a liquid crystal device, for example.

The present technology may have the following configurations.

(1) An infrared optical system, including:
a light collecting lens having a curved light collecting surface for collecting infrared light incident from an object side, the lens being made of resin having a stepped shape being gradually deeper from periphery to center; and
an optical path length correction element for correcting a difference in an optical path length produced by the stepped shape of the light collecting lens.

(2) The infrared optical system according to (1) above, in which
the optical path length correction element has a refractive index higher than the light collecting lens.

(3) The infrared optical system according to (1) or (2) above, in which
an antireflection processing is applied to the optical path length correction element.

(4) The infrared optical system according to any one of (1) to (3) above, in which
the optical path length correction element is provided with the stepped shape corresponding to the stepped shape of the light collecting lens.

(5) The infrared optical system according to (4) above, in which
a light beam transmitted through an nth step from a center of the light collecting lens passes through an nth step from a center of the optical path length correction element.

(6) The infrared optical system according to (5) above, in which
widths of each step of the light collecting lens having the stepped shape perpendicular to an optical axis are equal excluding the step positioned at an outermost periphery.

(7) The infrared optical system according to any one of (1) to (6) above, in which
a maximum thickness in an area contributing to image formation of the light collecting lens in the optical axis direction is desirably 1 mm or less.

(8) The infrared optical system according to any one of (1) to (7) above, in which
the light collecting lens is made of polyethylene.

(9) The infrared optical system according to any one of (2) to (8) above, in which
the optical path length correction element is made of Si.

DESCRIPTION OF REFERENCE NUMERALS 1 infrared image capturing apparatus
2 optical block
3 Image sensor
4 image signal acquisition unit
5 image signal processing unit
11,21 first lens, 12 second lens
13 sensor window
14 aperture stop
15 optical path length correction element

What is claimed is:

1. An infrared optical system, comprising:
   a light collecting lens having a curved light collecting surface for collecting infrared light incident from an object, the light collecting lens being made of resin having a first stepped shape being gradually deeper from periphery to center; and
   an optical path length correction element for correcting a difference in an optical path length produced by the first stepped shape of the light collecting lens,
   wherein the optical path length correction element has a second stepped shape provided on a surface that faces a surface of the light collecting lens that has the first stepped shape.

2. The infrared optical system according to claim 1, wherein
   an antireflection processing is applied to the optical path length correction element.

3. The infrared optical system according to claim 2, wherein
   the optical path length correction element is provided with the second stepped shape corresponding to the first stepped shape of the light collecting lens.

4. The infrared optical system according to claim 3, wherein
   a light beam transmitted through an nth step from a center of the light collecting lens passes through an nth step from a center of the optical path length correction element.

5. The infrared optical system according to claim 4, wherein
   widths of each step of the light collecting lens having the first stepped shape perpendicular to an optical axis are equal excluding the step positioned at an outermost periphery.

6. The infrared optical system according to claim 1, wherein
   a maximum thickness in an area contributing to image formation of the light collecting lens in the optical axis direction is desirably 1 mm or less.

7. The infrared optical system according to claim 1, wherein
   the light collecting lens is made of polyethylene.

8. An infrared optical system according to claim 1, wherein
   a first light beam from the object passes through an outermost periphery of the light collecting lens, and wherein a second light beam from the object passes through the first stepped shape of the light collecting lens.

9. The infrared optical system according to claim 1, wherein
   a thickness of the optical path length correction element corresponds to a depth of the first stepped shape of the light collecting lens.

10. An infrared image capturing apparatus, comprising:
    an infrared optical system, including:
       a light collecting lens having a curved light collecting surface for collecting infrared light incident from an object, the light collecting lens being made of resin having a first stepped shape being gradually deeper from periphery to center; and
       an optical path length correction element for correcting a difference in an optical path length produced by the first stepped shape of the light collecting lens,
       wherein the optical path length correction element has a second stepped shape provided on a surface that faces a surface of the light collecting lens that has the first stepped shape;
    an infrared detector for detecting infrared light collected by the infrared optical system; and
    an image signal acquisition unit for acquiring an infrared image capturing signal based on an infrared detecting signal provided by the infrared detector.

11. An infrared optical system, comprising:
    a light collecting lens includes a curved light collecting surface for collecting infrared light incident from an object, the light collecting lens being made of resin and has a stepped shape being gradually deeper from periphery to center; and
    an optical path length correction element for correcting a difference in an optical path length produced by the stepped shape of the light collecting lens,
    wherein the optical path length correction element has a refractive index higher than the light collecting lens.

12. An infrared optical system, comprising:
    a light collecting lens includes a curved light collecting surface that collects infrared light incident from an object, the light collecting lens is made of resin and has a stepped shape that is gradually deeper from periphery to center; and
    an optical path length correction element for correcting a difference in an optical path length produced by the stepped shape of the light collecting lens,
    wherein the optical path length correction element has a refractive index higher than the light collecting lens, and
    wherein the optical path length correction element is made of Si.

* * * * *